April 12, 1938.   H. C. PORTER   2,113,769
CUTTING TOOL
Filed Oct. 9, 1935   2 Sheets-Sheet 1
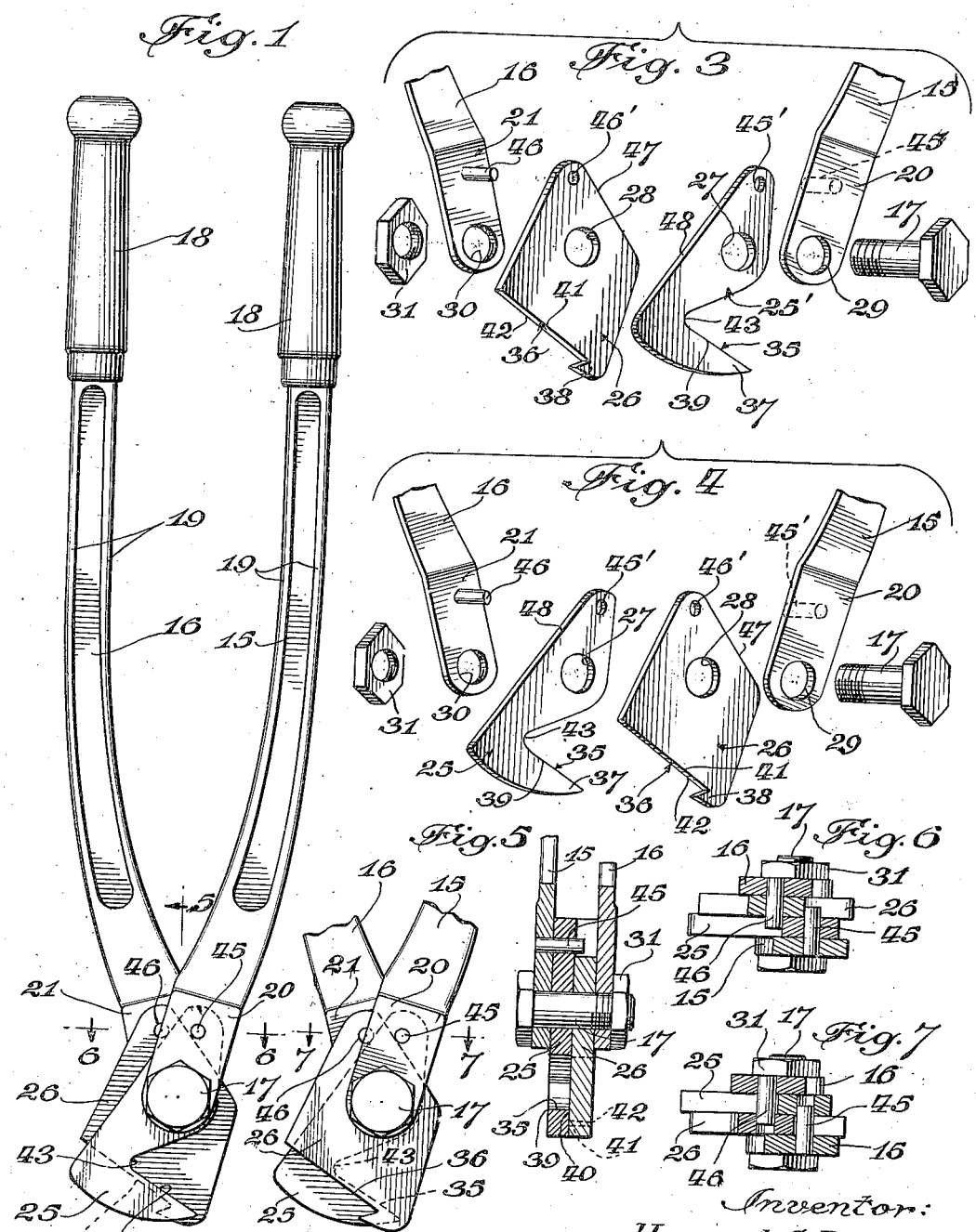

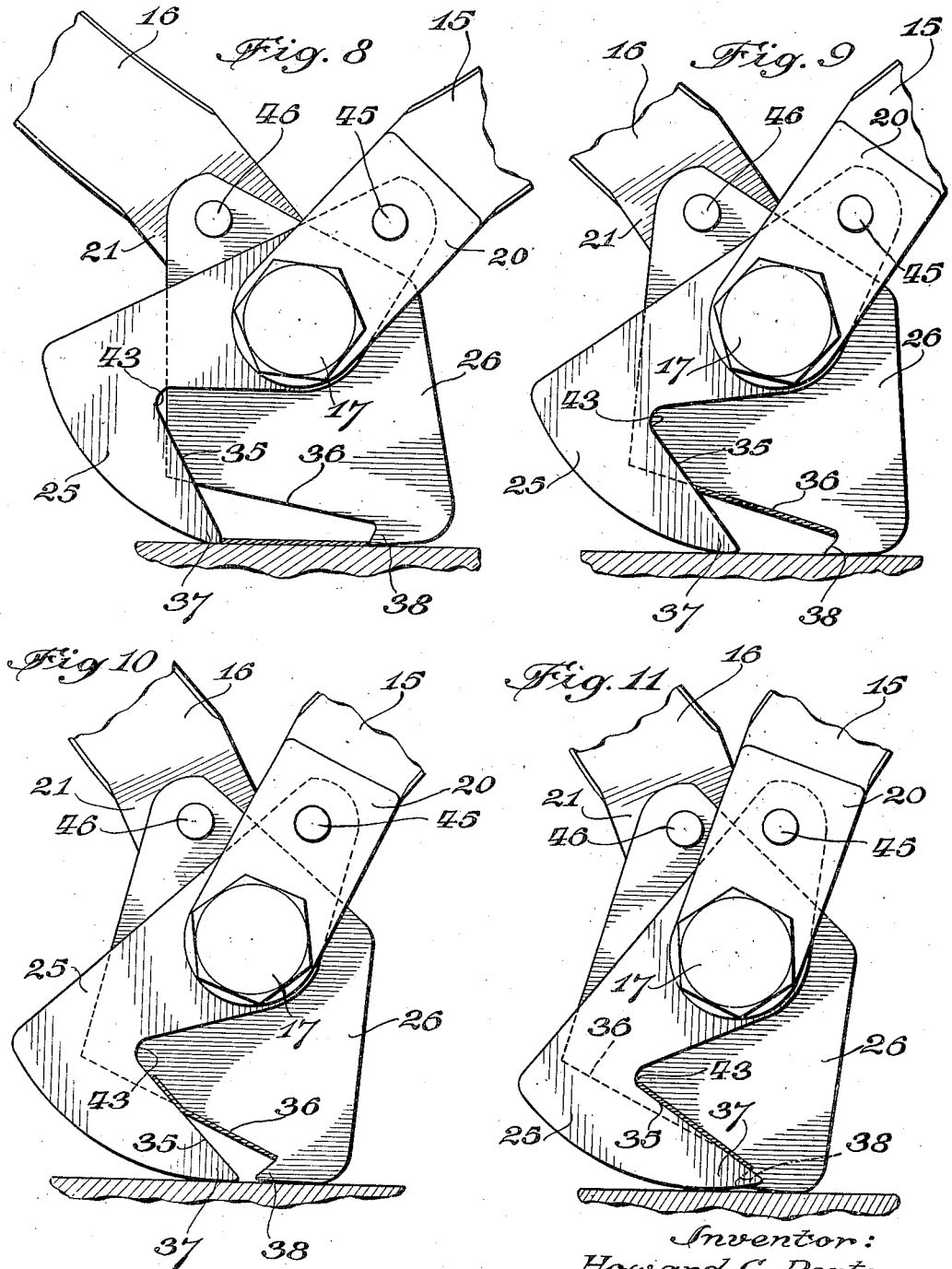

Patented Apr. 12, 1938

2,113,769

UNITED STATES PATENT OFFICE 2,113,769

CUTTING TOOL

Howard C. Porter, La Grange, Ill., assignor to Signode Steel Strapping Company, Chicago, Ill., a corporation of Delaware Application October 9, 1935, Serial No. 44,237

3 Claims. (Cl. 30—259)

My invention relates to cutting tools.

This application is a continuation in part of my copending application Serial No. 591,285 filed February 6, 1932.

The invention will be illustrated and explained as embodied in a scissor-type cutting tool especially effective for use in severing tensioned binder-strap which tightly encircles packages or groups of packages, and equally effective either when the packages are compressible so that the tensioned binder indents them, or when the packages are solid or rigid and are not indented by the tensioned binder.

One of the objects of my invention is to provide an improved cutting tool.

Another object is to provide a cutting tool which may be readily sharpened, even by those unaccustomed to sharpening shearing tools.

A further object is to provide a scissor-type cutter which will not tighten and bind or become unduly loose in use, but which, after sharpening, may be readily adjusted to compensate for or "take up" the loss of blade thickness due to sharpening.

Another object is to provide a cutter in which the blades automatically insert themselves gradually between the band and the encircled package as the blades close while cutting the band.

A further object is to provide a strong, light, effective and reliable scissor action cutting tool.

Other objects and advantages will hereinafter appear.

In the drawings:

Fig. 1 is a side elevation of the entire cutting tool, the handles and blades being in closed position;

Fig. 2 is a side elevation of the blades only, taken from the same side as Fig. 1, but with the blades interchanged to reverse the cutting edges;

Fig. 3 is a separated view of the blades, handles and pivot bolt preparatory to being assembled in the relationship shown in Fig. 1;

Fig. 4 is a similar separated view with the parts ready for assembly in the relationship shown in Fig. 2;

Fig. 5 is a section on the line 5—5 of Fig. 1;

Fig. 6 is a section on the line 6—6 of Fig. 1;

Fig. 7 is a section on the line 7—7 of Fig. 2;

Fig. 8 is an enlarged view of the relationship shown in Fig. 1, with the blades open for application to the band;

Fig. 9 is a view similar to Fig. 8, with the blades partly closed ready to commence the cutting or shearing operation;

Fig. 10 is a similar view with the blades further closed, as during an early stage of the cutting operation, and Fig. 11 is a like view of the blades almost completely closed toward the end of the cutting operation.

One of the principal features of my improved cutter is the use of two interchangeable, perfectly flat and parallel faced blades, each of which provides two like shearing or cutting edges formed by the right angles between the parallel flat side faces and the intermediate edge face, together with a pair of driving and stop pins, one for each handle, which cooperate with the blades in either position to communicate thereto the thrust or drive exerted upon the handles and to limit both the opening and closing movement of blades and handles. Thus, as will be more fully hereinafter explained, the tool has two pairs of cutting edges, both of which, by the simple expedient of transposing the blades, may be successively utilized before sharpening becomes necessary.

Referring to Figs. 1 and 3, the cutter includes a pair of handles 15 and 16 pivoted together, scissor fashion, by a threaded bolt 17. If desired, the extremities of handles 15 and 16 may be equipped with suitable hand grips 18. Throughout most of their length the handles which, for the usual heavy duty work should be made of steel forgings, may be shaped so as to give the adequate strength and rigidity with desirable lightness. Thus, they may be provided with longitudinal strengthening ribs 19. The extremities 20 and 21 opposite the grips, however, are flattened so as to provide proper bearing surfaces for the cutting blades.

A pair of cutting blades or jaws 25 and 26 is mounted upon and supported by bolt 17. The blades have smooth holes 27 and 28 respectively and handle 15 has a smooth hole 29 which align and through which bolt 17 passes with a fit tight enough to prevent undue looseness and play, but loose enough to permit the blades and handles 15 to be assembled thereon. Handle 16 is provided with a threaded hole 30 which fits the threads of bolt 17, and a lock nut 31 serves to prevent loosening of the bolt and thereby holds the assembly closely together when tightened down upon handle 16.

Blades 25 and 26, which may be made of suitable hardened alloy steel and sufficiently thick to withstand the service required, have their opposite side faces parallel and perfectly flat. Blade 25 has a flat straight edge face 35 which faces inwardly or toward the pivot while blade 26

26 has a flat straight edge face 36 which faces outwardly or away from the pivot. The nose of blade 35 is formed into a rather sharply pointed prong 37 which is adapted to wedge itself gradually between the band and the package as the jaws close and the severing operation proceeds. The nose of blade 26 is provided with an undercut hook 38 which serves as an abutment against which, by the mere closing of the handles, one edge of the band is forced to lie before cutting begins and as cutting proceeds. The undercut angle of this hook causes the band to be tightly held against the edge face 36 and thereby facilitates the maintenance of a good shearing action between the active cutting edges of the blades.

The edge faces 35 and 36 are, of course, interposed between the parallel flat side faces of their respective blades and are disposed at right angles to both side faces. Each blade, therefore, has two similar shearing or cutting edges, each formed by the right angle at the junction of its edge face and one of its side faces. Thus, blade 25 has two straight shearing or cutting edges 39 and 40, and blade 26 has two straight shearing or cutting edges 41 and 42. Each cutting edge of each blade may be readily sharpened merely by grinding the adjacent flat side face of the blade, by placing it against a surface grinder or the side of an emery wheel. Such sharpening cannot affect the angle of the shearing edge—which always remains a right angle—and, therefore, requires no special care or skill. Of course, each sharpening slightly thins the blades, but such thinning is readily compensated for by the amount bolt 17 is threaded into handle 16 when the tool is reassembled.

Blade 25 is so shaped as to provide a recess 43 extending rearwardly from the effective or shear portion of its shearing edges 39 and 40, such recess serving to accommodate the severed edge of one section of the cut strap and thereby render it unnecessary for the blade to deform the strap either longitudinally or transversely, to any objectionable extent to enable the blade to pass the severed strap edge as the cutting progresses.

Handles 15 and 16 are provided with drive and stop pins 45 and 46 respectively, which respectively fit holes 45' and 46' in blades 25 and 26 and serve, as will be hereinafter described, to communicate the handle movements to the blades and to limit the blade and handle movements in both the opening and closing directions.

When the handles and blades are assembled, as shown in Figs. 1, 5 and 6 (i. e., in the order appearing in Fig. 3, with blade 25 next to handle 15 and blade 26 next to handle 16), shearing edge 40 of blade 25 and shearing edge 41 of blade 26 constitute the active cutting edges of the tool; blade 25 is driven by handle 15 through the shank portion of pin 45 and blade 26 is driven by handle 16 through the shank portion of pin 46. Pins 45 and 46 also constitute stops or movement limiting means for both the opening of the handles and blades and the closing thereof. Thus, the projecting tip of pin 45 strikes the rear edge 47 of blade 26 and the projecting tip of pin 46 strikes the rear edge 48 of blade 25 both in the full open position and in or slightly beyond the cut-completing position of the blades and handles.

Upon shearing edges 40 and 41 becoming dull, the tool may be readily placed in good condition by transposing the blades into the order appearing in Figs. 2, 4 and 7, (i. e., by reversing the locations of the blades relative to the handles, placing blade 25 adjacent handle 16 and blade 26 adjacent handle 15). This is accomplished by removing lock nut 31, unscrewing bolt 17 from handle 16 and merely reversing the order of the blades. In this way edges 39 and 42 (instead of 40 and 41) are positioned next to each other and become the active cutting edges. Blade 25 will now be driven by the tip of pin 45 and blade 26 by the tip of pin 46; the shank of pin 45 engages the rear edge 47 of blade 26 and the shank of pin 46 engages the rear edge 48 of blade 25 to limit the opening and closing movements of the blades and handles.

Because of this capability of providing two sets of shearing edges, one of which is available after the other has become too dull for effective use, the tool need not be resharpened until both sets of cutting edges become dull. Then the tool can be easily and quickly taken apart, both shearing edges of both blades sharpened, merely by grinding the flat side faces thereof as heretofore explained, and the tool is again ready for assembly with the two sets of cutting edges again sharp. Thus, the use of the tool need not be interrupted for sharpening upon the dulling of one set of shearing or cutting edges, but may continue, with only the short interruption necessary to transpose the blades, until both sets of edges become dull. Often this capability will enable a job or the working day to be finished without the necessity of resharpening the tool, whereupon the tool can be sharpened in whole or in part as desired or necessary.

Referring now to Figs. 8 to 11, the tool is illustrated in various stages of strap cutting operation. In preparing the tool for application over a band to be cut, the handles are separated to open the blades somewhat further than shown in Fig. 8, i. e., until pins 45 and 46 strike the rear edges of blades 26 and 25, respectively. In this position the center line of the tool between the handles is substantially perpendicular to the plane of the strap (and also the surface of the package) and the handles may be brought toward each other to cut the band with the operator's arms in a natural and comfortable position. In this condition edge face 36 of blade 26 is substantially horizontal (i. e., parallel to the plane of the band) and the operator can place the tool properly merely by lowering his arms until the tips of the blades strike the package. Now by starting the closing of the handles and some relatively slight pressure toward the package, the pointed prong of blade 25 will engage under one edge of the band and push the band (or cause a slight counter-movement of the tool if the band is under heavy tension) toward, into and up the inclined surface of the hook of blade 26 where the band becomes tightly wedged flat against edge face 36. As the closing of the handles continues, the cutting or shearing of the band begins and proceeds and, as cutting proceeds, prong 37 of blade 25 is inserted further and further under the band. Because the edge face 35 of blade 25 first attacks the band at relatively an obtuse angle and maintains such an angle relative thereto throughout a considerable part of the cutting operation, the power required at the handles merely to shear the band is relatively small.

On the other hand, the band must be distorted transversely of its normal plane more abruptly and to a greater extent in the first stages of the cut than during the final stages (as will be understood by a comparison of Figs. 10 and 11) and the greater distortion takes more power. I have found that by relating the edge faces so that they approach at an angle to each other of about 35° to 43° at the beginning of the cut and at an angle of about 8° to 12° in the final stages of the cut and that with a ratio between the distance from the pivotal axis to the rear initial shear point between blades and the maximum width of band of about 6 to 5, the decreasing effort required by the lessening distortion and the increasing effort required by the shearing angle becoming more acute, about balance each other and an even application of force may be expended throughout the entire shearing operation. I have also found that the attainment of this end, i. e., uniform application of power or effort throughout the cutting range, is assisted by so relating the blades and their edge faces that at least 20% of the width of the maximum size band for which the tool is intended lies toward the prong 37 of blade 25 from a perpendicular to edge face 36 through the axis of the tool.

By having the load, during both the cutting stages and at the final or "stopping" stage, divided between the two drive-stop pins, the wear is equalized, and thereby reduced, and the destructive effect of the final blow (when the band is cut through and the pins strike the blades to arrest further movement) is minimized. The use of a single pivot bolt, which serves not only to hold the handles and blades together, but also as a means for permitting "take up" to compensate for wear and the thinning of the blades from sharpening, renders my tool exceedingly simple and easy to maintain in an effective condition.

Having thus illustrated and described the preferred embodiment of my invention, what I claim and desire to secure by United States Letters Patent is as follows:

1. A strap cutting tool comprising a first handle and a second handle, a pivot pin pivoting the handles to each other scissor fashion, a pair of blades pivoted on the pivot pin and interposed between the handles for pivotal movement about the pivot independently of the handles, a first pin on the first handle eccentric to the pivot pin serving to drive one blade and stop the other blade, and a second pin on the second handle eccentric to the pivot pin serving to drive the other blade and stop the one blade.

2. A strap cutting tool comprising a pair of handles; a pivot bolt connecting the handles together scissor fashion; a pair of flat parallel-faced blades interposed between the handles and pivotally carried by the pivot bolt for pivotal movement thereabout independently of the handles, each blade having two parallel cutting edges which, by interchanging the positions of the blades upon the pivot bolt, may be successively brought into register with the cutting edges of the other blade; a pair of pins, one carried by each handle, each pin in both blade positions cooperating with its own blade to drive the same and cooperating with the other blade to limit the movement of the handles.

3. A strap cutting tool comprising a pair of handles; a pivot connecting the handles together scissor fashion; a pair of blades interposed between the handles and carried by the pivot, each blade having parallel side faces and a flat straight edge face between the side faces to provide one blade with a straight shearing edge which faces inwardly toward the pivot and the other blade with a straight shearing edge which faces outwardly away from the pivot and with the shearing edges at more or less right angles to a radius from the pivot and the blade with the inwardly directed shearing edge having a recess extending rearwardly of the effective portion of its shearing edge to receive one of the edges of the cut strap as the cutting proceeds; and means associated with the handles and blades for causing the handles to drive the blades.

HOWARD C. PORTER.